3,011,995
THE USE OF DIALLYL TEREPHTHALATE OR TETRAALLYL TEREPHTHALAMIDE TO PROMOTE THE CURING OF FLUOROCARBON ELASTOMERS WITH DICUMYL PEROXIDE AND MAGNESIUM OXIDE

John F. Smith, Brandywine Hundred, Del., assignor to E. I. du Pont de Nemours and Company, Wilmington, Del., a corporation of Delaware
No Drawing. Filed Apr. 12, 1960, Ser. No. 21,600
9 Claims. (Cl. 260—41)

This invention relates to an improved process for curing fluorocarbon elastomers.

Fluorocarbon elastomers are especially valuable because of their thermal stability and their good resistance to a wide variety of solvents, oils, fuels and the like, particularly at high temperatures. Thus they are being increasingly used in the manufacture of tubing employed as aircraft hose for carrying fuels, lubricants, and the like at high temperatures and pressures. They are also finding applications as O rings in hydraulic systems and as diaphragms in control devices.

It is an object of the present invention to provide an improved process for curing fluorocarbon elastomers. A further object is to provide an improved process for curing black-loaded fluorocarbon elastomers. Other objects will appear hereinafter.

These and other objects of this invention are accomplished by a process for preparing a cured fluorocarbon elastomer which comprises incorporating therewith, per 100 parts by weight of said fluorocarbon elastomer, (a) from about 5 to 20 parts by weight of magnesium oxide, (b) from about 2 to 10 parts by weight of dicumyl peroxide and (c) from about 1 to 3 parts by weight of diallyl terephthalate or tetraallyl terephthalamide; followed by heating the compounded stock at temperatures between about 100 and 200° C. so as to effect a cure. The use of diallyl terephthalate or tetraallyl terephthalamide in conjunction with the other curing agents results in highly improved cured products.

The fluorocarbon elastomers which may be cured according to the process of this invention include (a) a vinylidene fluoride-hexafluoropropene copolymer containing from 30 to 70 percent by weight of vinylidene fluoride and from 70 to 30 percent by weight of hexafluoropropene and (b) a copolymer of vinylidene fluoride, hexafluoropropene and tetrafluoroethylene containing from 3 to 35 percent by weight of tetrafluoroethylene units, the balance being vinylidene fluoride and hexafluoropropene units, with the weight ratio of vinylidene fluoride units to hexafluoropropene units having a value ranging from 2.33:1 to 0.667:1.

In order that the copolymers of vinylidene fluoride and hexafluoropropene be elastomeric, it is necessary that they contain from about 30 to about 70 percent by weight of vinylidene fluoride units with a preferred elastomeric copolymer containing between about 53 and 70 percent by weight of vinylidene fluoride units. The copolymers of vinylidene fluoride and hexafluoropropene are described in "Industrial and Engineering Chemistry," vol. 49, p. 1687 (1957), French Patent 1,153,164, Italian Patent 553,285 and British patent specification 789,786.

The other elastomeric copolymers, which may be used, contain from 3 to 35 percent by weight of tetrafluoroethylene units, the balance being vinylidene fluoride and hexafluoropropene units, with the weight ratio of vinylidene fluoride units to hexafluoropropene units having a value ranging from 2.33:1 to 0.667:1. The weight ratio of vinylidene fluoride to hexafluoropropene corresponds to a range of 70 to 40 percent by weight of vinylidene fluoride and 30 to 60 percent by weight of hexafluoropropene monomer units. Within this ratio the copolymer is elastomeric. When the proportion of hexafluoropropene to vinylidene fluoride drops below about 30 percent the products are plastic rather than elastic. On the other hand about 60 percent is the largest proportion of hexafluoropropene which yields a satisfactory elastic copolymer. In the same vein, the content of tetrafluoroethylene units should not exceed about 35 percent by weight of the total copolymer if the elastomeric properties of the copolymer are to be retained. A preferred range of composition for the copolymers used in the present invention consists of 15 to 25 percent by weight of tetrafluoroethylene units and 85 to 75 percent by weight of vinylidene fluoride and hexafluoropropene units, the vinylidene fluoride and hexafluoropropene units being present in a weight ratio within the range of 2.33:1.0 to 0.667:1.0.

These copolymers are made by copolymerization of a mixture of the monomers using well known polymerization conditions. Preferably the familiar aqueous redox polymerization system is used. Polymerization may be initiated by the use of the ammonium persulfate-sodium bisulfite system. Polymerization is normally accomplished under pressure at moderately elevated temperatures.

The curing agents used in the present invention are incorporated into the fluoroelastomer by conventional methods such as by milling in heavy-duty mixers or on the usual rubber milling equipment.

Ordinarily, water-cooled milling equipment will be used so that curing or cross-linking temperatures are not reached. Although the curing agents can be added in any order, it is preferred to introduce the dicumyl peroxide last in order to avoid the possibility of scorching.

For each 100 parts by weight of the fluorocarbon elastomer, about 2 to 10 parts by weight of dicumyl peroxide, about 5 to 20 parts by weight of magnesium oxide, and about 1 to 3 parts by weight of diallyl terephthalate or tetraallyl terephthalamide are incorporated. When lesser amounts of these reagents are present, the vulcanizates obtained are undercured. A stiff vulcanizate results when much more than about 20 parts of magnesium oxide is used. No advantage accrues from the use of more than 10 parts of dicumyl peroxide. Accentuated fluorocarbon elastomer weight loss occurs during high temperature heat aging if decidedly more than 3 parts of diallyl terephthalate or tetraallyl terephthalamide is present.

Fillers and reinforcing agents, such as carbon blacks and the known wide variety of mineral fillers, may be employed in varying quantities, such as from 10 to 60 parts, depending upon the degree of hardness, heat resistance and stability in general desired in the cured product. The carbon blacks may be those normally used in elastomers, such as thermal, furnace, and channel blacks. Mineral fillers including the fine silicas, clays and diatomaceous earth, may be used. Alkaline fillers such as alkaline carbon blacks and silicas are preferred. Pigments may be incorporated for color effects.

After the fluorocarbon elastomer has been completely compounded, the stock obtained is cured by heating. In general, temperatures between about 100° C. and 200° C. are used. In order to reach as complete a state of cure as possible, it is recommended that at least the final portion of the curing cycle be carried out in an open oven at about 200° C. Thin films (e.g. 0.1 inch in thickness) or small articles from which water vapor and other gaseous by-products of the cure can escape can be vulcanized directly this way. However, larger articles of thicker cross-section need a preliminary curing cycle under compression in a mold to develop sufficient cross-links within them to prevent rupture and sponging from occurring when they are heated in an open oven. Accordingly, the cure is quite frequently carried out in two stages: the first, a press cure of about 5 to 60 minutes at 100–150°

C.; the second, a subsequent oven cure at about 200° C. for at least 10 hours. The articles are held in the press for as long a time as is necessary to develop sufficient cross-links to prevent rupture and sponging on subsequent heating in an open oven. The time required for this operation will depend upon the size and thickness of the article involved. Those skilled in the art can readily determine the optimum conditions for a particular article. In general, it is preferred to press cure at 150° C. for 5 to 60 minutes.

For the oven cycle 18 to 20 hours is preferred. When a period shorter than 18 hours is employed, the compression set of the vulcanizate leaves something to be desired and aftercuring during high temperature use may occur. Extension of oven curing beyond 20 hours is unnecessary and uneconomical.

The following example will better illustrate the nature of the present invention; however, the invention is not intended to be limited to this example. Parts are by weight unless otherwise indicated.

EXAMPLE

I. Description of copolymer

A. VINYLIDENE FLUORIDE (VF₂)/HEXAFLUOROPROPENE (HFP) COPOLYMER

Copolymer A is a 60/40 weight percent copolymer of $VF_2$ and HFP. It has an inherent viscosity (.1 g. copolymer in 100 cc. of an 87/13 weight percent tetrahydrofuran (THF)/dimethyl formamide (DMF) mixture at 30° C.) of .95±.05, a Mooney viscosity (ML 10 at 100° C.) of 75±6 and a number-average molecular weight of about 100,000.

The general procedure for preparation of a copolymer of this type is given in "Industrial and Engineering Chemistry" 49, 1687 (1957).

II. Curing procedure

Five stocks (1A–1E) were compounded on a cold rubber roll mill according to the recipes given in Table I below. The dicumyl peroxide was added last. The stocks thereby obtained were heated in 3 x 6 x ¼" molds in a press at 150° C. for one hour. Subsequently they were removed from the molds and heated in a circulating air oven at 200° C. for 18 hours to complete the cure. The stress-strain properties of the various vulcanizates were then measured in accordance with ASTM Test Method 412-51T. The data obtained, which are displayed in Table I below, show that the use of diallyl terephthalate or tetraallyl terephthalamide produces vulcanizates with superior physical properties.

TABLE I

| Component | Stocks | | | | |
|---|---|---|---|---|---|
| | 1A | 1B | 1C | 1D | 1E |
| Copolymer A | 100 | 100 | 100 | 100 | 100 |
| Medium Thermal Black | | | 18 | 18 | 18 |
| "Hi Sil 202" [1] | 15 | 15 | | | |
| Magnesium Oxide | 15 | 15 | 15 | 15 | 15 |
| Diallyl Terephthalate | 2 | | | 2 | |
| Tetraallyl Terephthalamide | | | | | 2 |
| Dicumyl peroxide (100%) | 2 | 2 | 2 | 2 | 2 |
| Property (at 25° C.): | | | | | |
| $M_{100}$ (p.s.i.) | 350 | 400 | Sponged | 250 | 280 |
| $M_{200}$ (p.s.i.) | 900 | 700 | Sponged | 600 | 620 |
| $T_B$ (p.s.i.) | 2,500 | 1,000 | Sponged | 1,850 | 2,080 |
| $E_B$ (percent) | 480 | 480 | Sponged | 560 | 510 |

[1] Precipitated hydrated silica of very fine particle size (has a particle size of about 0.022 micron and a surface area of 150 square meters per gram and contains 10.7% of water of hydration, corresponding to 0.073 gram of water per 100 square meters of surface area). Commercially available from Columbia-Southern Chemical Corporation, Pittsburgh, Pennsylvania.

As many widely different embodiments of this invention may be made without departing from the spirit and scope thereof, it is to be understood that this invention is not limited to the specific embodiments thereof except as defined in the appended claims.

What is claimed is:

1. A process of curing a fluorocarbon elastomer selected from the group consisting of a vinylidene fluoride-hexafluoropropene copolymer containing from about 30 to 70 percent by weight of vinylidene fluoride and from about 70 to 30 percent by weight of hexafluoropropene and a vinylidene fluoride-hexafluoropropene-tetrafluoroethylene copolymer containing from about 3 to 35 percent by weight of tetrafluoroethylene units, the balance being vinylidene fluoride and hexafluoropropene units, with the weight ratio of vinylidene fluoride units to hexafluoropropene units having a value ranging from about 2.33:1 to 0.667:1 which comprises incorporating therewith, per 100 parts by weight of said elastomer, (a) from about 5 to 20 parts by weight of magnesium oxide, (b) from about 2 to 10 parts by weight of dicumyl peroxide and (c) from about 1 to 3 parts by weight of a compound selected from the group consisting of diallyl terephthalate and tetraallyl terephthalamide; followed by heating at temperatures between about 100 and 200° C. so as to effect a cure.

2. A process according to claim 1 wherein the fluorocarbon elastomer is a vinylidene fluoride-hexafluoropropene copolymer containing from about 30 to 70 percent by weight of vinylidene fluoride and from about 70 to 30 percent by weight of hexafluoropropene.

3. A process according to claim 1 wherein the fluorocarbon elastomer is a vinylidene fluoride-hexafluoropropene-tetrafluoroethylene copolymer containing from about 3 to 35 percent by weight of tetrafluoroethylene units, the balance being vinylidene fluoride and hexafluoropropene units with the weight ratio of vinylidene fluoride units to hexafluoropropene units having a value ranging from about 2.33:1 to 0.667:1.

4. A process according to claim 2 wherein about 2 parts by weight of diallyl terephthalate is incorporated with the fluorocarbon elastomer.

5. A process according to claim 2 wherein about 2 parts by weight of tetraallyl terephthalamide in incorporated with the fluorocarbon elastomer.

6. A process according to claim 3 wherein about 2 parts by weight of diallyl terephthalate is incorporated with the fluorocarbon elastomer.

7. A process according to claim 3 wherein about 2 parts by weight of tetraallyl terephthalamide is incorporated with the fluorocarbon elastomer.

8. A process according to claim 4 wherein about 15 parts by weight of magnesium oxide and about 2 parts by weight of dicumyl peroxide are incorporated with the fluorocarbon elastomer.

9. A process according to claim 5 wherein about 15 parts by weight of magnesium oxide and about 2 parts by weight of dicumyl peroxide are incorporated with the fluorocarbon elastomer.

References Cited in the file of this patent

UNITED STATES PATENTS

| | | |
|---|---|---|
| 2,820,776 | Robb et al. | Jan. 21, 1958 |
| 2,944,995 | Dosmann et al. | July 12, 1960 |